April 21, 1925.
J. S. WHITE
TRUCK
Filed Feb. 25, 1924
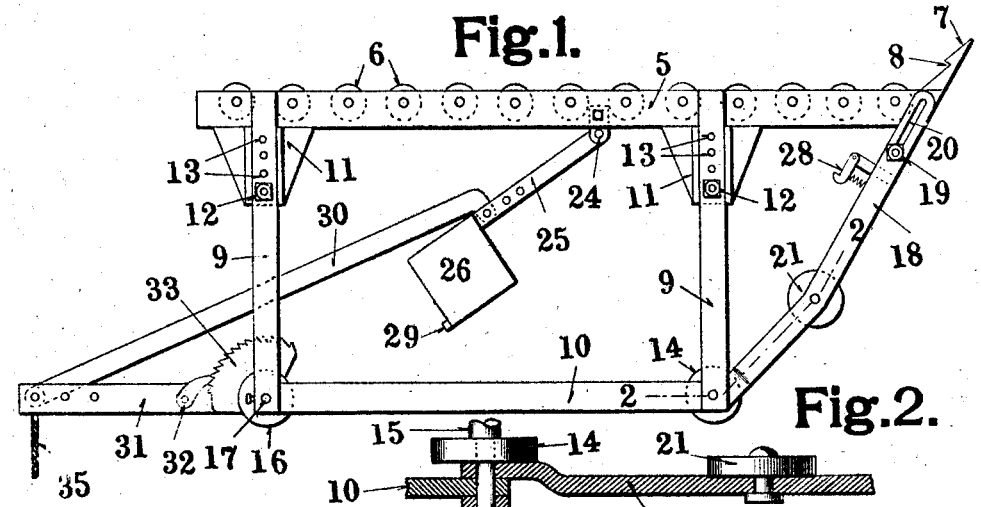
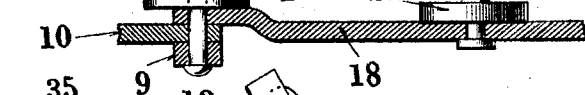
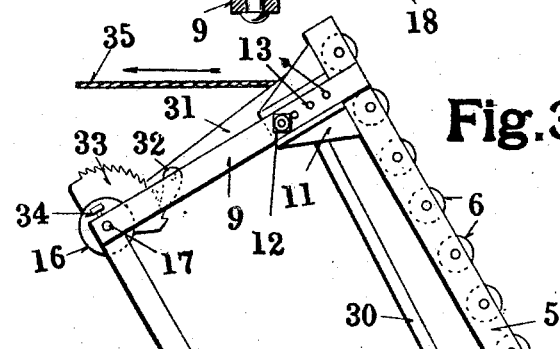
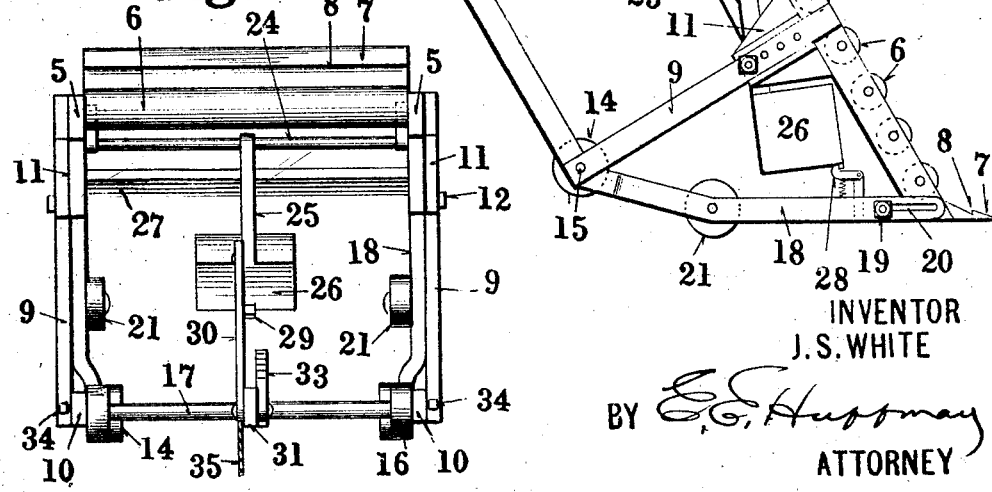
INVENTOR
J. S. WHITE
BY *E. G. Huffman*
ATTORNEY Patented Apr. 21, 1925.

1,534,346

UNITED STATES PATENT OFFICE.

JOHN S. WHITE, OF ST. LOUIS, MISSOURI.

TRUCK.

Application filed February 25, 1924. Serial No. 694,830.

*To all whom it may concern:*

Be it known that I, JOHN S. WHITE, a citizen of the United States of America, residing at the city of St. Louis, State of Missouri, United States of America, have invented a certain new and useful Truck, of which the following is such a full, clear, and exact description as will enable any one skilled in the art to which it appertains to make and use the same, reference being had to the accompanying drawings, forming part of this specification.

My invention relates to a truck and has for its object the production of a truck which will combine the ease of loading of the ordinary two-wheeled hand truck with the advantages of the four-wheeled type.

In the accompanying drawings which illustrate one form of truck made in accordance with my invention, Figure 1 is a side elevation; Figure 2 is an enlarged section taken on the line 2—2 of Figure 1; Figure 3 is a side view showing the truck in loading position; and Figure 4 is an end view.

The top of the truck consists of two side rails 5 and a number of rollers 6 extending between the rails and projecting slightly above the same to form a conveyor surface. At the forward end of the top the truck is provided with a lifting lip 7 similar to that of the ordinary two-wheeled hand truck. This lip is preferably provided, intermediate of its width, with a retaining tooth 8. The side rails 5 are supported on uprights 9, those at each side being connected by lower side rails 10. In order to vary the height of the top of the truck and thus adapt it to discharge articles upon platforms, wagons, etc., of different heights the uprights 9 are slidingly mounted in brackets 11 secured to the side rails 5. Bolts 12 carried by the said brackets and passing through holes 13 in the uprights secure the parts in position.

The truck when in its normal position, as shown in Figure 1, rests on a pair of front wheels 14 mounted on an axle 15, and a pair of rear wheels 16 mounted on an axle 17. Extending from the axle 15 to the front end of the top of the truck are a pair of bars 18 preferably bent at a point intermediate their length and secured to downward extension of the rails 5 by bolts 19 engaging with slots 20 in the bars to accommodate the different heights of the top. The bars 18 are pivoted on the axle 15 to allow the slight change in the angle between the bars and uprights when the top is raised or lowered. Secured to the bars 18 at their bends are pivot members 21. In the drawing I have shown these pivot members in the form of wheels, but as they function only as fulcrums in raising the articles to be trucked, they are not necessarily rotary.

Pivoted to a shaft 24 supported below the side rails 5 is an arm 25 carrying a weight 26 for changing the center of gravity of the truck. Mounted on a cross bar 27 carried by the bent bar 18 is a spring detent 28 adapted to engage with a lug 29 on the weight 26, as shown in Figure 3, and thus transfer the center of gravity of the truck toward the front end. The weight 26 should be sufficiently heavy to transfer the center of gravity to a point in front of the wheels 14 and preferably in front of the pivot members 21. A connecting rod 30 extends from the arm 25 to a lifting lever 31 pivotally mounted on the axle 17. Mounted on the lever 31 is a dog 32 engaging with a ratchet segment 33 rigidly mounted on the axle. To hold the segment in position some means, such as the set screws 34, is used to prevent the axle from rotating. It will be understood that the wheels 16 turn freely on the axle. A rope or cable 35 is preferably secured to the lifting-lever for convenience in operating it to lift the load.

The operation of my truck is as follows:

The parts being in the position shown in Figure 1, when it is desired to load the truck the dog 32 is thrown out of engagement with the segment 33 and the weight 26 caused to swing on its pivot by means of the lever 31. As soon as the center of gravity of the truck is moved forward of the wheels 14 the truck will tilt on these wheels as a fulcrum thus accelerating the weight which, by its further movement, will engage with the detent 28 causing a further tilting of the truck on the pivot members 21 so that the truck will rest on these members and the lifting lip 7, as shown in Figure 3. After the lifting lip has been inserted below the box, or other article to be lifted, and the article pulled back against the rollers 6, the detent 28 is released, the dog 32 thrown into engagement with the segment 33 and rope 35 drawn in the direction indicated by the arrow in Figure 3, the movement of the lever 31 will swing the weight 26 toward the position shown in Figure 1. At or before the time the weight reaches this position, depending on the relative mass of the weight and load, the truck will be tilted first on the auxiliary pivots 21 and afterward on the wheels 14 until the truck is returned to normal position.

Having fully described my invention, what I claim as new and desire to secure by Letters Patent of the United States is:

1. In a device of the class described, a wheeled platform provided with a lifting lip, said platform being adapted to be tilted into approximately vertical position, front wheels forming a fulcrum, and a weight arranged below said platform and movable to shift the center of gravity from one to the other side of said front wheels, and to enable the platform to remain in tilted position.

2. In a device of the class described, a wheeled platform provided with a lifting lip, said platform being adapted to be tilted into approximately vertical position, front wheels forming a fulcrum, an auxiliary fulcrum arranged between said front wheels and lip, and a weight arranged below said platform and movable to shift the center of gravity to upend the truck and to enable the platform to remain in tilted position.

3. In a device of the class described, a wheeled platform provided with a lifting lip, front wheels forming a fulcrum, a pivoted weight arranged below the platform and swinging in the direction of the length of the device to change the center of gravity, and a lifting lever operatively connected to said weight.

4. In a device of the class described, a wheeled platform provided with a lifting lip, front wheels forming a fulcrum, a pivoted weight arranged below the platform and swinging in the direction of the length of the device to change the center of gravity, a detent adapted to retain said weight in its forward position, and a lifting lever operatively connected to said weight.

5. In a device of the class described, a wheeled platform provided with a lifting lip, front wheels forming a fulcrum, a pivoted weight arranged below the platform and swinging in the direction of the length of the device to change the center of gravity, a detent adapted to retain the weight in its forward position, a lifting lever operatively connected to said weight, and ratchet mechanism for retaining said weight in retracted position.

6. In a device of the class described, a base provided with a lifting lip, front and rear pairs of wheels, a pair of bent struts extending between the front wheels and said lip, auxiliary fulcrum members carried by said struts, a pivoted weight, a detent for retaining said weight in its forward position, a lifting lever operatively connected with said weight, and ratchet mechanism for retaining said weight in retracted position.

7. In a device of the class described, a platform comprising side rails with a plurality of rolls mounted therein and a lifting lip carried thereby, uprights carried by said side rails and provided with wheels, struts extending from the front pair of uprights and attached to the side rails adjacent to the lifting lip, a weight for shifting the center of gravity, and an extensible lifting lever for moving the device into and out of loading position, said lever being operatively connected with said weight.

In testimony whereof, I have hereunto set my hand this the 21st day of February 1924.

JOHN S. WHITE. [L. S.]